United States Patent
Li et al.

(10) Patent No.: US 12,470,789 B2
(45) Date of Patent: Nov. 11, 2025

(54) CAMERA MODULE AND ELECTRONIC DEVICE

(71) Applicant: VIVO MOBILE COMMUNICATION CO., LTD., Guangdong (CN)

(72) Inventors: Huacong Li, Guangdong (CN); Yunfa He, Guangdong (CN); Ze Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 209 days.

(21) Appl. No.: 18/338,590

(22) Filed: Jun. 21, 2023

(65) Prior Publication Data
US 2023/0336855 A1 Oct. 19, 2023

Related U.S. Application Data

(63) Continuation of application No. PCT/CN2021/138664, filed on Dec. 16, 2021.

(30) Foreign Application Priority Data

Dec. 23, 2020 (CN) .......................... 202011541995.4

(51) Int. Cl.
*H04N 23/51* (2023.01)
*G03B 17/12* (2021.01)
*H04N 23/55* (2023.01)

(52) U.S. Cl.
CPC ............. *H04N 23/51* (2023.01); *G03B 17/12* (2013.01); *H04N 23/55* (2023.01)

(58) Field of Classification Search
CPC ......... H04N 23/51; H04N 23/55; G03B 17/12
(Continued)

(56) References Cited

U.S. PATENT DOCUMENTS

| 2006/0269262 A1 | 11/2006 | Shin et al. |
| 2014/0184891 A1 | 7/2014 | Lee et al. |

(Continued)

FOREIGN PATENT DOCUMENTS

| CN | 105573014 A | 5/2016 |
| CN | 205507322 | * 8/2016 |

(Continued)

OTHER PUBLICATIONS

First Office Action for Chinese Application No. 202011541995.4, dated Nov. 26, 2021, 7 Pages.

(Continued)

*Primary Examiner* — Joel W Fosselman
(74) *Attorney, Agent, or Firm* — BROOKS KUSHMAN P.C.

(57) ABSTRACT

A camera module and an electronic device. The camera module includes: a housing, an accommodating chamber being provided in the housing; a lens assembly, the lens assembly being movably disposed in the accommodating chamber; a first drive assembly, the first drive assembly being connected to the lens assembly so as to drive the lens assembly to move, and at least part of the first drive assembly being disposed on an inner side wall of the housing; a circuit board, the circuit board being connected to the lens assembly; and a second drive assembly, the second drive assembly being disposed in the housing, and at least part of the second drive assembly being connected to the circuit board so as to drive the circuit board to move.

16 Claims, 5 Drawing Sheets

(58) Field of Classification Search
USPC .................................................. 348/207.99
See application file for complete search history.

(56) References Cited

U.S. PATENT DOCUMENTS

| | | |
|---|---|---|
| 2015/0229843 A1 | 8/2015 | Shimizu |
| 2017/0363881 A1 | 12/2017 | Stec |
| 2018/0100986 A1 | 4/2018 | Kim et al. |
| 2018/0284477 A1 | 10/2018 | Minamisawa |
| 2019/0052786 A1 | 2/2019 | Suto et al. |
| 2019/0141219 A1 | 5/2019 | Oh et al. |
| 2019/0204531 A1 | 7/2019 | Sugawara |
| 2021/0218868 A1 | 7/2021 | Kim et al. |
| 2022/0146782 A1 | 5/2022 | Ni et al. |

FOREIGN PATENT DOCUMENTS

| | | |
|---|---|---|
| CN | 109061979 A | 12/2018 |
| CN | 111061029 A | 4/2020 |
| CN | 111586270 A | 8/2020 |
| CN | 111654612 A | 9/2020 |
| CN | 111726508 A | 9/2020 |
| CN | 212135045 U | 12/2020 |
| CN | 112637469 A | 4/2021 |
| WO | 2019221447 A1 | 11/2019 |

OTHER PUBLICATIONS

International Search Report and Written Opinion for Application No. PCT/CN2021/138664, dated Feb. 16, 2022, 9 Pages.
European Search Report for Application No. 21909251.7, Mailed May 10, 2024, 10 pages.
Indian Examination Report for Application No. 202317048633, Mailed Jan. 20, 2025, 5 pages.

\* cited by examiner

CAMERA MODULE AND ELECTRONIC DEVICE

CROSS-REFERENCE TO RELATED APPLICATIONS

This application is a continuation of International Application No. PCT/CN2021/138664, filed on Dec. 16, 2021, which claims priority to Chinese Patent Application No. 202011541995.4 filed on Dec. 23, 2020, which are incorporated herein by reference in their entireties.

TECHNICAL FIELD

This application pertains to the field of camera technologies, and specifically, relates to a camera module and an electronic device.

BACKGROUND

With the rapid development of information network technologies, video has become the first choice for daily communication and sharing of people. Therefore, increasingly high requirements are imposed on image quality in a video shooting process. However, the anti-shake capability of conventional optical anti-shake cameras no longer meets the needs of people, affecting user experience. In order to improve the anti-shake performance of cameras, a gimbal system is built into cameras, especially mobile phone cameras. Gimbal cameras differ from conventional optical anti-shake cameras in actuation. The actuation of an optical anti-shake camera means motion inside the module while a gimbal camera entails motion of the entire module.

SUMMARY

According to a first aspect, an embodiment of this application provides a camera module. The camera module includes: a housing, an accommodating chamber being provided in the housing; a lens assembly, the lens assembly being movably disposed in the accommodating chamber; a first drive assembly, the first drive assembly being connected to the lens assembly so as to drive the lens assembly to move, and at least part of the first drive assembly being disposed on an inner side wall of the housing; a circuit board, the circuit board being connected to the lens assembly; and a second drive assembly, the second drive assembly being disposed in the housing, and at least part of the second drive assembly being connected to the circuit board so as to drive the circuit board to move.

According to a second aspect, an embodiment of this application provides an electronic device including the foregoing camera module.

Additional aspects and advantages of the embodiments of this application will be given in part in the following description, part of which will become apparent from the following description or be learned from the practice of the embodiments of this application.

BRIEF DESCRIPTION OF DRAWINGS

The above and/or additional aspects and advantages of this application will become obvious and easy to understand from the description of the embodiments with reference to the following drawings.

REFERENCE SIGNS camera module 100;
housing 10; accommodating chamber 11; bracket 12; cover plate 13; crossed support shaft 14;
lens assembly 20;
first drive assembly 30; first magnetic part 31; first coil 32;
circuit board 40; first board body 41; second board body 42;
second drive assembly 50; second magnetic part 51; second coil 52;
flexible circuit board storage part 60;
flexible circuit board position feedback element 70; lens assembly position feedback element 80;
flexible circuit board 1; camera module head 2; and flexible circuit board box 3.

DETAILED DESCRIPTION

The embodiments of this application are described in detail below. Examples of the embodiments are shown in the accompanying drawings, and reference signs that are the same or similar always indicate the same or similar components or components with the same or similar functions. The embodiments described below with reference to the drawings are illustrative and merely for explaining this application. They should not be construed as limitations on this application. Persons of ordinary skill in the art can still obtain other embodiments based on the embodiments of this application without creative efforts, and all these embodiments shall fall within the protection scope of this application.

A feature modified by the term "first", "second", or the like in the specification and claims of this application can explicitly or implicitly include one or more such features. In the descriptions of this application, "a plurality of" means two or more unless otherwise stated. In addition, "and/or" in the specification and claims represents at least one of connected objects, and the character "I" generally indicates that the contextually associated objects have an "or" relationship.

In the description of this application, it should be understood that the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for the ease and brevity of description of this application rather than indicating or implying that the apparatuses or components mentioned must have specific orientations or must be constructed or manipulated according to specific orientations, and therefore shall not be construed as any limitations on this application.

In the description of this application, it should be noted that unless otherwise specified and defined explicitly, the terms "mount", "connect", and "attach" should be understood in their general senses. For example, they may refer to a fixed connection, a detachable connection, or an integral connection; a mechanical connection or an electrical connection; and a direct connection, an indirect connection via an intermediate medium, or an internal communication between two elements. Persons of ordinary skill in the art can understand specific meanings of these terms in this application as appropriate to specific situations.

Figure 1:
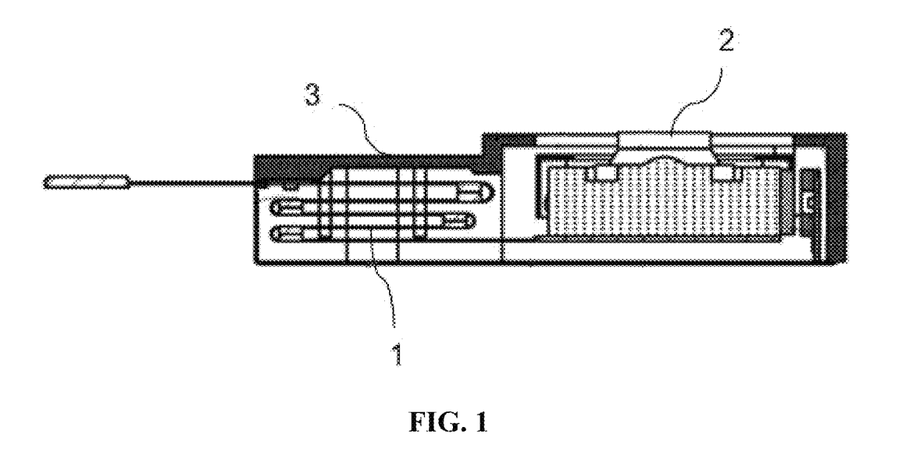
FIG. 1 is a cross-sectional view of an anti-shake gimbal in a related art.
Figure 2:
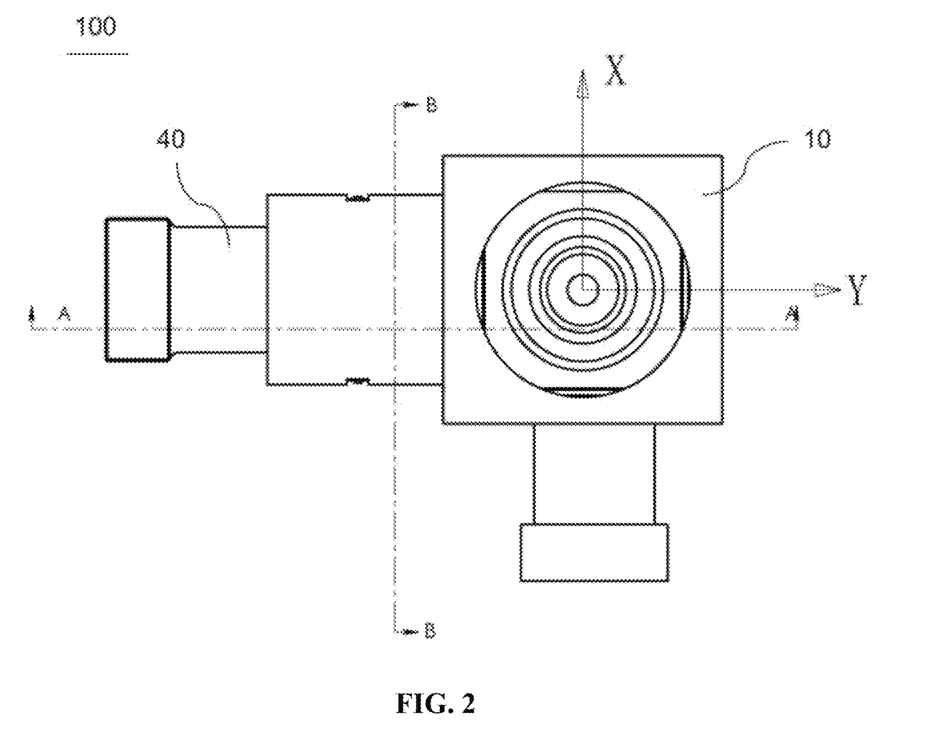
FIG. 2 is a top view of a camera module according to an embodiment of this application.

FIG. 1 shows an anti-shake gimbal in the prior art.

As shown in FIG. 1, a flexible circuit board 1 in an existing anti-shake gimbal enters a sealed flexible circuit board box 3 after its wire is led out of a side of a camera module head 2. In the flexible circuit board box 3, the flexible circuit board is folded into five layers in an S shape and then extends out of the flexible circuit board box 3 to be connected to a main board. In this way, during actuation of the camera module, there is still space for the flexible circuit board 1 to stretch or retract in the flexible circuit board box 3, and thus resistance is reduced. However, this scheme still cannot effectively prevent the flexible circuit board 1 from pulling the gimbal, limiting the optical anti-shake performance.

In view of this, the inventors of this application have creatively obtained the following invention by long-term research and experiments.

A camera module 100 according to an embodiment of this application includes a housing 10, a lens assembly 20, a first drive assembly 30, a circuit board 40, and a second drive assembly 50.

Specifically, an accommodating chamber 11 is provided in the housing 10. The lens assembly 20 is movably disposed in the accommodating chamber 11. The first drive assembly 30 is connected to the lens assembly 20 so as to drive the lens assembly 20 to move. At least part of the first drive assembly 30 is disposed in the housing 10. The circuit board 40 is connected to the lens assembly 20. The second drive assembly 50 is disposed in the housing 10, and at least part of the second drive assembly 50 is connected to the circuit board 40 so as to drive the circuit board 40 to move.

In other words, the camera module 100 according to this embodiment of this application mainly includes a housing 10, a lens assembly 20 mounted in the housing 10, a first drive assembly 30 driving the lens assembly 20 to move, a circuit board 40 electrically connected to the lens assembly 20, and a second drive assembly 50 driving the circuit board 40 to move. The housing 10 is a basic component of the camera module 100, and the housing 10 can provide a foundation for installing other components of the camera module 100. In an embodiment of this application, the housing 10 has an accommodating chamber 11, and the accommodating chamber 11 can be used to accommodate the lens assembly 20.

In a specific shooting process, the camera module 100 may tilt due to shaking, eventually affecting the quality of the shot. In the camera module 100 disclosed in embodiments of this application, the lens assembly 20 is movable with respect to the housing 10, and the first drive assembly 30 drives the lens assembly 20 to move so as to compensate tilt caused by shake of the camera module 100, thereby effectively stabilizing the camera module 100.

In an embodiment of this application, while the first drive assembly 30 is driving the lens assembly 20 to move, the second drive assembly 50 is capable of driving the circuit board 40 to move in the same direction, alleviating the pulling caused by the lens assembly 20 to the circuit board 40. It should be noted that movement of the lens assembly 20 includes translation and rotation, which is not limited herein.

It should be noted that when to be mounted, the first drive assembly 30 may be connected to the lens assembly 20 in a prior manner. For example, as shown in FIG. 2 to FIG. 5, a part of the first drive assembly 30 is connected to the housing 10, and another part of the first drive assembly 30 is connected to the lens assembly 20.

When to be mounted, the second drive assembly 50 may be partially mounted in the accommodating chamber 11 and connected to the circuit board 40, or entirely mounted outside the accommodating chamber 11 and connected to the circuit board 40.

In addition, the first drive assembly 30 and the second drive assembly 50 include but are not limited to motors, but may instead be other drive structures that can make the lens assembly 20 and the circuit board 40 move, for example, driving motors or driving motors plus cooperating transmission means.

As such, according to the camera module 100 in this embodiment of this application, the first drive assembly 30 and the second drive assembly 50 are used to drive the lens assembly 20 and the circuit board 40 respectively so that the circuit board 40 and the lens assembly 20 move in a same direction, preventing the lens assembly 20 from pulling the circuit board 40 when in motion, thereby enabling the lens assembly 20 to move a longer distance and rotate a larger angle.

According to this embodiment of this application, the circuit board 40 and the lens assembly 20 are driven to move synchronously by the second drive assembly 50 and the first drive assembly 30 respectively, further avoiding relative motion between the circuit board 40 and the lens assembly 20, thereby further improving the anti-pulling effect of the circuit board 40.

Figure 4:
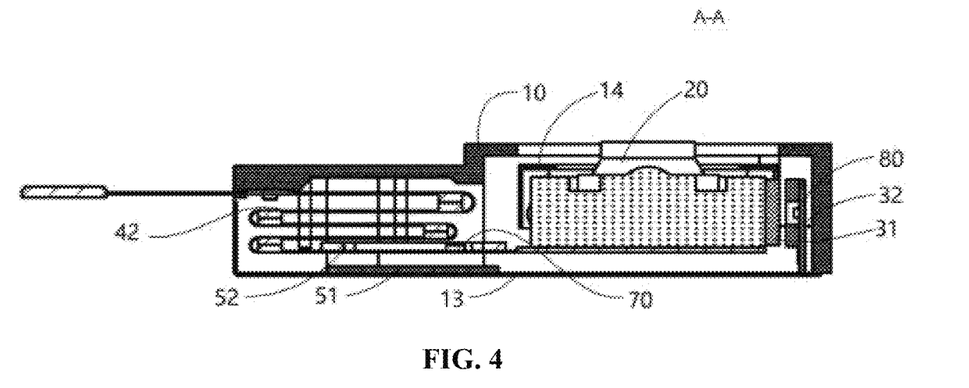
FIG. 4 is a cross-sectional view along line A-A in FIG. 2.
Figure 5:
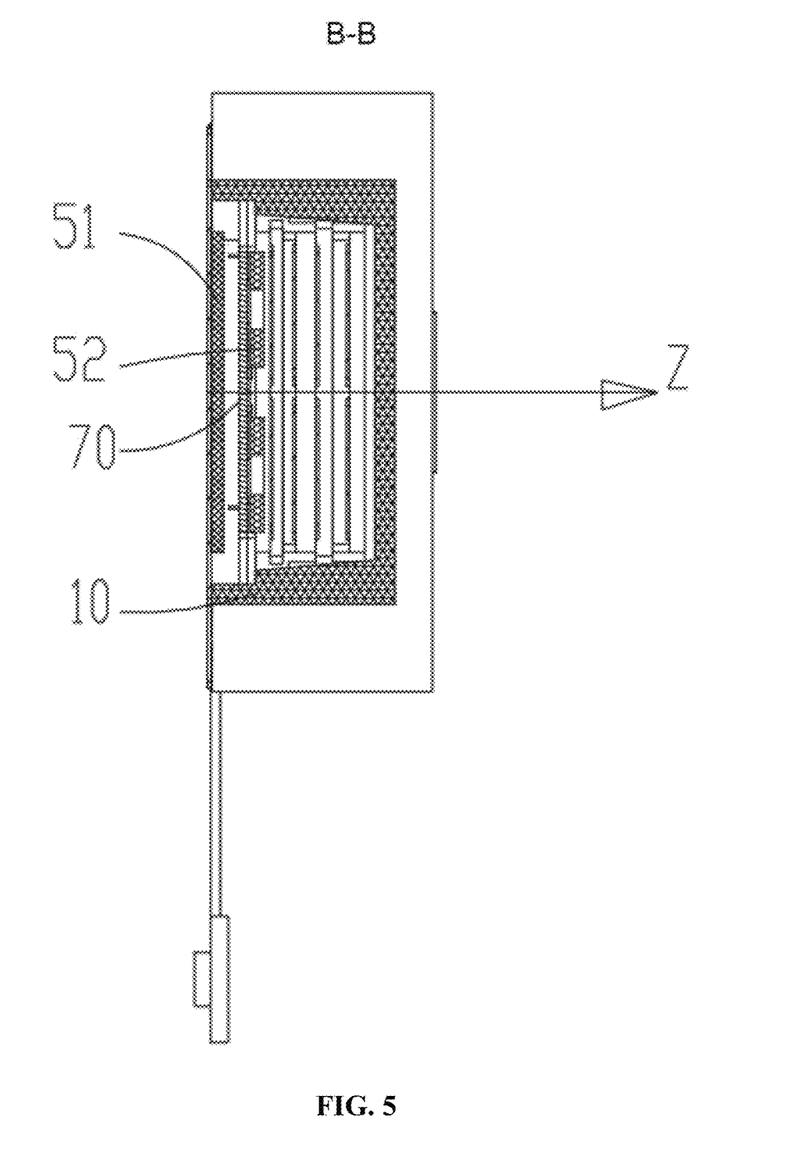
FIG. 5 is a cross-sectional view along line B-B in FIG. 2.
Figure 6:
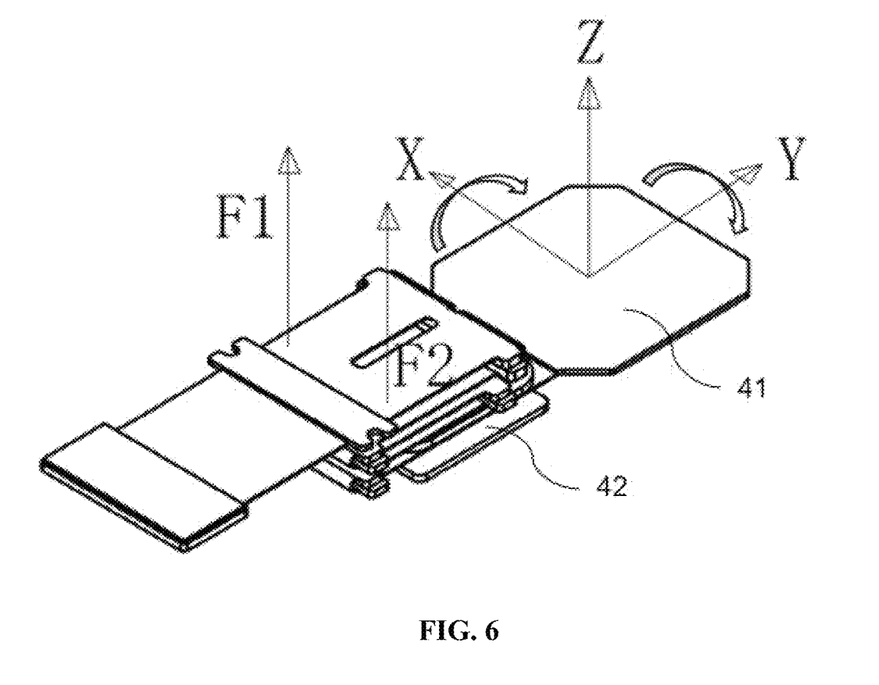
FIG. 6 is a schematic diagram showing forces experienced by a circuit board of a camera module according to an embodiment of this application.

In some specific implementations of this application, the first drive assembly 30 includes a first magnetic part 31 and a first coil 32, where one of the first magnetic part 31 and the first coil 32 is connected to the housing 10, the other of the first magnetic part 31 and the first coil 32 is connected to the lens assembly 20, and when energized, the first coil 32 is movable with respect to the first magnetic part 31 so as to drive the lens assembly 20. In other words, the first magnetic part 31 may be disposed on the housing 10 and the first coil 32 may be disposed on the lens assembly 20; or the first magnetic part 31 may be disposed on the lens assembly 20 and the first coil 32 may be disposed on the housing 10. For example, as shown in FIG. 4 and FIG. 5, the first magnetic part 31 is disposed on an outer wall surface of the lens assembly 20, and the first coil 32 is disposed on an inner wall surface of the housing 10 and corresponds to the first magnetic part 31 in position.

According to an embodiment of this application, the housing 10 includes a bracket 12 and a cover plate 13, where the bracket 12 is provided with the accommodating chamber 11 having an opening on a first side, the lens assembly 20 can be disposed in the accommodating chamber 11 and is movable with respect to the bracket 12, and the circuit board 40 can be connected to the lens assembly 20 via the opening. The cover plate 13 is disposed on the first side of the bracket 12, and the second drive assembly 50 is disposed at the cover plate 13. Optionally, a part of the second drive assembly 50 may be disposed at the cover plate 13, and another part of the second drive assembly 50 may be disposed at the circuit board 40 and movable with respect to the cover plate 13.

Further, the circuit board 40 includes a first board body 41 and a second board body 42. The first board body 41 is disposed between the lens assembly 20 and the cover plate 13. A first side of the first board body 41 is connected to the lens assembly 20 and moves synchronously with the lens assembly 20. The second board body 42 is electrically connected to the first board body 41. The second drive assembly 50 is disposed between the second board body 42 and the cover plate 13, and the second drive assembly 50 is connected to the second board body 42 so as to drive the second board body 42 to move. The second board body 42 may be a flexible circuit board, a wire conductor, or the like.

For ease of description, the following defines that the camera module 100 is assembled along a vertical direction, with its front close to an observer and its back facing away from the observer.

Figure 3:
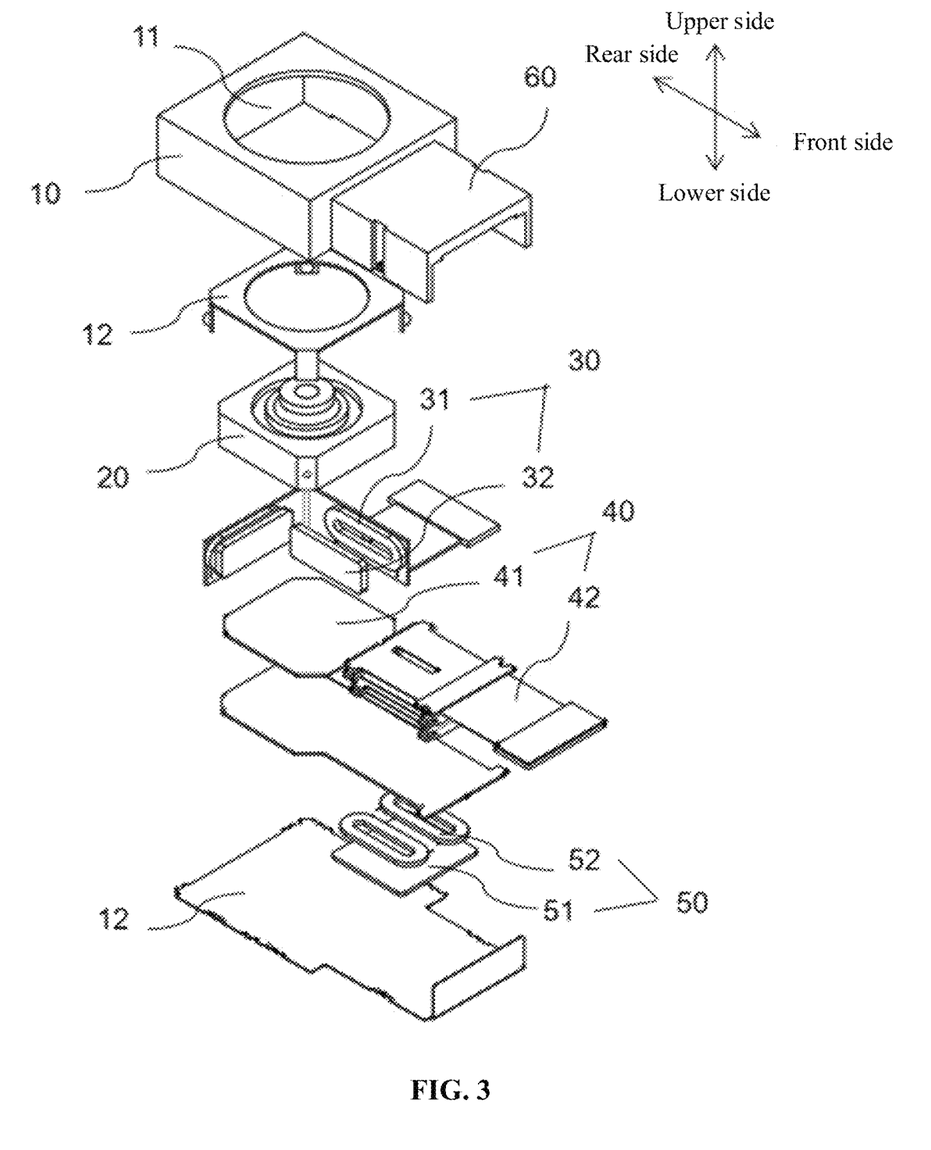
FIG. 3 is a partial exploded view of a camera module according to an embodiment of this application.

As shown in FIG. 3, the accommodating chamber 11 is defined inside the bracket 12, with an opening provided on the lower side of the bracket 12. The circuit board 40 is provided at the front side of the bracket 12, and the cover plate 13 is provided below the bracket 12 and the circuit board 40. The first board body 41 is on the rear side of the second board body 42 and below the lens assembly 20. During assembly, the first board body 41 extends between the bracket 12 and the cover plate 13 so as to be electrically connected to the lens assembly 20. In addition, a lower end face of the second board body 42 is connected to the second drive assembly 50 so that the second board body 42 and the lens assembly 20 move in a same direction. The circuit board 40 being divided to the first board body 41 and the second board body 42 facilitates connection of the circuit board 40 and the lens assembly 20 as well as movement of the lens assembly 20 while ensuring connection of the circuit board 40 and the second drive assembly 50.

It should be noted that the upper side, lower side, front side, and rear side as described above are defined for ease of description of the positional relationships or connection relationships of the components of the camera module 100 in the embodiments of this application, which do not limit the embodiments of this application in any sense.

In addition, for like parts or components in the embodiments of this application, there may be only one of the parts or components labeled by a reference sign, and that reference sign is equally applicable to other like parts or components.

Optionally, the first board body 41 is a circuit board, and the second board body 42 is a flexible circuit board. During assembly, the second board body 42 can be folded in an S shape. When the lens assembly 20 is moving, the second board body 42 can stretch or retract synchronously, thus expanding a movement range of the lens assembly 20. Further, the second board body 42 and the second drive assembly 50 are disposed opposite each other, thereby making full use of the space below the second board body 42. In a case that the housing 10 further includes a flexible circuit board storage part 60, as shown in FIG. 3, the flexible circuit board storage part 60 may be located on the front side of the bracket 12, and the second board body 42 and the second drive assembly 50 may both be located in the flexible circuit board storage part 60, thus making full use of the storage space for the flexible circuit board.

According to an embodiment of this application, the second drive assembly 50 includes a second magnetic part 51 and a second coil 52, where one of the second magnetic part 51 and the second coil 52 is connected to the cover plate 13, the other of the second magnetic part 51 and the second coil 52 is connected to the second board body 42, and when energized, the second coil 52 is movable with respect to the second magnetic part 51 so as to drive the second board body 42. In other words, the second magnetic part 51 may be disposed on the cover plate 13 and the second coil 52 may be disposed on the second board body 42; or the second magnetic part 51 may be disposed on the second board body 42 and the second coil 52 may be disposed on the cover plate 13. For example, as shown in FIG. 3, the second magnetic part 51 is disposed on a lower end face of the second board body 42, and the second coil 52 is disposed on an upper end face of the cover plate 13.

The following describes operating principles of the first drive assembly 30 and the second drive assembly 50 in the embodiments of this application with reference to the accompanying drawings.

The second magnetic part 51 cooperates with the second coil 52. The second magnetic part 51 can provide a magnetic field. When energized, the second coil 52 generates a force perpendicular to the magnetic field according to Fleming's left-hand rule, and that force can control movement of the circuit board 40 when acting on the circuit board 40. Similarly, the first magnetic part 31 cooperates with the first coil 32, where the first coil 32 can provide a thrust when energized.

In an embodiment of this application, as shown in FIG. 4, the lens assembly 20 can be mounted on the bracket 12 through crossed support shafts 14 that are diagonally interconnected. The crossed support shaft 14 may include two hinged shafts perpendicular to each other. The first drive assembly 30 may include two first magnetic parts 31 and two first coils 32, and the first drive assembly 30 drives the lens assembly 20 to rotate about one of the two hinged shafts. It should be noted that, in embodiments of this application, how technologically the first drive assembly 30 drives the lens assembly 20 to rotate is commonly known technology, about which details are not described herein.

In embodiments of this application, the second coil 52 of the second drive assembly 50 includes one or more coils. The following describes various types of the second drive assembly 50.

Case 1

One coil is provided. That one coil enables the circuit board 40 to do various types of movements.

Specifically, in a case that the coil is a linear conductor, it moves when energized. When the current direction or magnetic field direction is changed, the linear conductor moves reversely, so as to drive the circuit board 40 to move.

In a case that the coil is an annular conductor, when it is energized, two sides thereof are subjected to action forces in different directions, so the annular conductor can rotate around its axis, thereby driving the circuit board 40 to rotate in a specific direction.

Case 2

The second coil 52 includes two annular coils, and the two annular coils are spaced apart on the second board body 42.

Referring to FIG. 3, for example, the two annular coils may be a first annular coil and a second annular coil, respectively, where the first annular coil and the second annular coil may share one magnet. One of the first annular coil and the second annular coil is separately controlled to operate, so that the second board body 42 can rotate in a specific direction.

In an embodiment of this application, when the second board body 42 is folded in an S shape, the lower end face of the second board body 42 is approximately a rectangular part. For ease of description, a straight line parallel to a length direction of the second board body 42 is referred to as an axis Y, a straight line parallel to a width direction of the second board body 42 is referred to as an axis X, and a straight line perpendicular to a plane on which the second board body 42 is located is referred to as an axis Z. The second board body 42 may be folded approximately along the axis Z.

The first annular coil and the second annular coil are located on the lower end face of the second board body 42 and are spaced apart along the length direction of the second board body 42. The first annular coil and the second annular coil are both elliptic parts extending approximately along the width direction of the second board body 42. When equal action forces are generated by the first annular coil and the second annular coil, or the first annular coil or the second annular coil is turned on separately, the second board body 42 can rotate around the axis Y by defining of the current direction and the magnetic field direction.

It should be noted that the axes X, Y and Z as described above are defined merely for ease of description of the positional relationships or connection relationships of the components of the camera module 100 in the embodiments of this application, which do not limit the embodiments of this application in any sense.

Further, the second magnetic part 51 is a plate structure. This means the second magnetic part 51 may be a flat coil to effectively save space. The second magnetic part 51 is attached to the cover plate 13 for easy assembly. It should be noted that the second magnetic part 51 may be mounted on the cover plate 13 in other mounting manners, for example, detachable mounting manners such as clamping and insertion.

According to an embodiment of this application, the camera module 100 further includes a flexible circuit board position feedback element 70, where the flexible circuit board position feedback element 70 can be used to report a real-time position of the circuit board 40. The flexible circuit board position feedback element 70 may be a Hall chip or the like, which is not limited herein.

In some specific implementations of this application, the camera module further includes a lens assembly position feedback element, where the lens assembly position feedback element can be connected to the first drive assembly 30. During assembly and production of the camera module 100, when a linear motion relationship of the lens assembly is being calibrated, as the lens assembly moves, data reported by the lens assembly position feedback element and the flexible circuit board position feedback element 70 are acquired and a fitting algorithm is applied to record a correspondence between positions of the flexible circuit board and positions of the lens assembly. The correspondence is burned into a memory. During use, an electronic device invokes the data in the memory to control movement of the flexible circuit board, thereby counteracting the influence of pulling of the flexible circuit board on the lens assembly.

In other words, the flexible circuit board is provided with an additional closed-loop control system such that the flexible circuit board can move with the lens assembly, thereby avoiding interference caused by the flexible circuit board to the lens assembly, improving the anti-shake performance of the lens assembly.

An embodiment of this application further provides an electronic device including the camera module 100 according to any one of the foregoing embodiments. The lens assembly 20 can be electrically connected to a main board of the electronic device through the circuit board 40, so as to be supplied with power.

The electronic device in this embodiment of this application may be a smart phone, a tablet computer, a wearable device, or the like, which is not limited herein.

In the description of this specification, descriptions referring to the terms "an embodiment", "some embodiments", "exemplary embodiments", "an example", "a specific example", or "some examples" mean the specific features, structures, materials or characteristics described with reference to the embodiment or example are included in at least one embodiment or example of the this application. In this specification, illustrative expressions of these terms do not necessarily refer to the same embodiment or example. Moreover, the specific features, structures, materials, or characteristics described may be combined in any suitable manners in any one or more embodiments or examples.

Although some embodiments of this application have been illustrated and described, those of ordinary skill in the art can understand that various changes, modifications, substitutions, and variations of these embodiments may be made without departing from the principle and purpose of this application, and the scope of this application is defined by the claims and their equivalents.

What is claimed is:

1. A camera module, comprising:
   a housing, an accommodating chamber being provided in the housing;
   a lens assembly, the lens assembly being movably disposed in the accommodating chamber;
   a circuit board, the circuit board being connected to the lens assembly; and
   a gimbal assembly, the gimbal assembly comprising:
   a first drive assembly, wherein the first drive assembly is connected to the lens assembly so as to drive the lens assembly to move, and at least part of the first drive assembly is disposed on an inner side wall of the housing; and
   a second drive assembly, wherein the second drive assembly is disposed in the housing, and at least part of the second drive assembly is connected to the circuit board so as to drive the circuit board to move;
   wherein the second drive assembly drives the circuit board and the first drive assembly drives the lens assembly so that the circuit board and the lens assembly move synchronously.

2. The camera module according to claim 1, wherein the first drive assembly comprises a first magnetic part and a first coil; one of the first magnetic part and the first coil is disposed on an inner wall surface of the housing, and the other of the first magnetic part and the first coil is disposed on an outer wall surface of the lens assembly; and when energized, the first coil is movable with respect to the first magnetic part so as to drive the lens assembly.

3. The camera module according to claim 1, wherein the housing comprises:
   a bracket, the bracket being provided with the accommodating chamber having an opening on a first side; and
   a cover plate, the cover plate being disposed on the first side of the bracket, and the second drive assembly being disposed at the cover plate.

4. The camera module according to claim 3, wherein the circuit board comprises:

a first board body, wherein the first board body is disposed between the lens assembly and the cover plate, and a first side of the first board body is connected to the lens assembly and moves synchronously with the lens assembly; and a second board body, wherein the second board body is electrically connected to the first board body, the second drive assembly is disposed between the second board body and the cover plate, and the second drive assembly is connected to the second board body so as to drive the second board body to move.

5. The camera module according to claim 4, wherein the first board body is a circuit board, and the second board body is a flexible circuit board.

6. The camera module according to claim 5, wherein the second drive assembly comprises a second magnetic part and a second coil; one of the second magnetic part and the second coil is connected to the cover plate, and the other of the second magnetic part and the second coil is connected to the second board body; and when energized, the second coil is movable with respect to the second magnetic part so as to drive the second board body.

7. The camera module according to claim 6, wherein the second magnetic part is a plate structure, the second magnetic part being attached to the cover plate.

8. The camera module according to claim 6, wherein the second coil comprises two annular coils, the two annular coils being spaced apart on the second board body.

9. An electronic device, comprising a camera module, wherein the camera module comprises:

a housing, an accommodating chamber being provided in the housing;

a lens assembly, the lens assembly being movably disposed in the accommodating chamber;

a circuit board, the circuit board being connected to the lens assembly; and a gimbal assembly, the gimbal assembly comprising:

a first drive assembly, wherein the first drive assembly is connected to the lens assembly so as to drive the lens assembly to move, and at least part of the first drive assembly is disposed on an inner side wall of the housing; and a second drive assembly, wherein the second drive assembly is disposed in the housing, and at least part of the second drive assembly is connected to the circuit board so as to drive the circuit board to move;

wherein the second drive assembly drives the circuit board and the first drive assembly drives the lens assembly so that the circuit board and the lens assembly move synchronously.

10. The electronic device according to claim 9, wherein the first drive assembly comprises a first magnetic part and a first coil; one of the first magnetic part and the first coil is disposed on an inner wall surface of the housing, and the other of the first magnetic part and the first coil is disposed on an outer wall surface of the lens assembly; and when energized, the first coil is movable with respect to the first magnetic part so as to drive the lens assembly.

11. The electronic device according to claim 9, wherein the housing comprises:

a bracket, the bracket being provided with the accommodating chamber having an opening on a first side; and a cover plate, the cover plate being disposed on the first side of the bracket, and the second drive assembly being disposed at the cover plate.

12. The electronic device according to claim 11, wherein the circuit board comprises:

a first board body, wherein the first board body is disposed between the lens assembly and the cover plate, and a first side of the first board body is connected to the lens assembly and moves synchronously with the lens assembly; and a second board body, wherein the second board body is electrically connected to the first board body, the second drive assembly is disposed between the second board body and the cover plate, and the second drive assembly is connected to the second board body so as to drive the second board body to move.

13. The electronic device according to claim 12, wherein the first board body is a circuit board, and the second board body is a flexible circuit board.

14. The electronic device according to claim 13, wherein the second drive assembly comprises a second magnetic part and a second coil; one of the second magnetic part and the second coil is connected to the cover plate, and the other of the second magnetic part and the second coil is connected to the second board body; and when energized, the second coil is movable with respect to the second magnetic part so as to drive the second board body.

15. The electronic device according to claim 14, wherein the second magnetic part is a plate structure, the second magnetic part being attached to the cover plate.

16. The electronic device according to claim 14, wherein the second coil comprises two annular coils, the two annular coils being spaced apart on the second board body.

* * * * *